(12) United States Patent
Manohar

(10) Patent No.: US 11,797,217 B2
(45) Date of Patent: Oct. 24, 2023

(54) SYSTEMS AND METHODS FOR COLLECTING STORAGE DEVICE STATISTICS

(71) Applicant: KIOXIA Corporation, Tokyo (JP)

(72) Inventor: Kadam Manish Manohar, San Jose, CA (US)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 16/735,617

(22) Filed: Jan. 6, 2020

(65) Prior Publication Data

US 2021/0208810 A1 Jul. 8, 2021

(51) Int. Cl.
G06F 3/06 (2006.01)

(52) U.S. Cl.
CPC .......... *G06F 3/0653* (2013.01); *G06F 3/0604* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| 5,838,891 A * | 11/1998 | Mizuno ............... G06F 11/3058 714/5.11 |
| 7,743,284 B1 * | 6/2010 | Taylor ................. G06F 11/0775 714/42 |
| 10,038,615 B1 * | 7/2018 | Zhuang ................ H04L 41/142 |
| 2006/0085166 A1 * | 4/2006 | Ochi .................... G06F 11/3495 702/186 |
| 2009/0222615 A1 | 9/2009 | Kurashige |
| 2014/0173268 A1 | 6/2014 | Hashimoto |
| 2017/0024266 A1 * | 1/2017 | Iwai .................... G06F 11/3656 |
| 2017/0220259 A1 * | 8/2017 | Choi .................... G06F 3/0634 |

OTHER PUBLICATIONS

Foreign Search Report on PCT/IB2020/062603 dated Apr. 13, 2021.

\* cited by examiner

*Primary Examiner* — Farley Abad
*Assistant Examiner* — Dayton Lewis-Taylor
(74) *Attorney, Agent, or Firm* — Foley & Lardner LLP

(57) ABSTRACT

Various implementations described herein relate to systems and methods for collecting Solid State Drive (SSD) statistics. A controller, in response to receiving a start command from a host, creates a slot area in a storage device of the SSD corresponding to a slot, collects first statistics data from one or more modules of the SSD, and stores the first statistics data in the slot area. Further, the controller, in response to receiving a stop command, collects second statistics data from the one or more modules and sends the first statistics data and the second statistics data to the host.

19 Claims, 4 Drawing Sheets

SYSTEMS AND METHODS FOR COLLECTING STORAGE DEVICE STATISTICS

TECHNICAL FIELD

The present disclosure relates generally to systems and methods for collecting statistics data in Solid State Drive (SSD) storage devices.

BACKGROUND

A user or firmware developer of SSD firmware may be interested in obtaining statistics of an SSD to assess various aspects of the SSD. Typically, a storage device offers a facility to log events of interest and for a host device to request the contents of a log page with details of the events. However there is no control over the timing of the logging of events.

SUMMARY

In certain aspects, the present implementations are directed to collecting SSD statistics. For example, a controller, in response to receiving a start command from a host, creates a slot area in a storage device of the SSD corresponding to a slot, collects first statistics data from one or more modules of the SSD, and stores the first statistics data in the slot area. Further, the controller, in response to receiving a stop command, collects second statistics data from the one or more modules and sends the first statistics data and the second statistics data to the host.

DETAILED DESCRIPTION

Among other aspects, the present disclosure relates to collecting and transmitting statistics of an SSD, and improvements to obtaining statistics and event logs for a storage device. The firmware implemented by a controller of the SSD can collect such statistics over time, which can include, but are not limited to, event information logs, error information logs, code trace logs, storage and power usage information, drive information, telemetry, self-test results and performance statistics. The collected statistics can be used for determining an overall health of the SSD (e.g., of the NAND flash memory devices thereof), debugging SSD firmware issues, validating the SSD firmware, characterizing SSD performance, and so on.

In some implementations, one or more slots are defined for collecting the statistics. Each slot corresponds to a time interval during which the statistics are collected, in some examples. The statistics collected for a slot can provide a snapshot of the operations of the SSD, which can be used, in an example, for debugging SSD firmware issues. In some implementations, the slot has a start time and an end time. Examples of a duration of the slot include but are not limited to, one or more seconds, one or more minutes, one or more hours, and so on. In some examples, the end time corresponds a moment in time at which the SSD firmware encounters an issue or the SSD firmware fails. In some examples, statistics collected for each slot are stored together in a data storage (e.g., a buffer) of the SSD.

Figure 1:
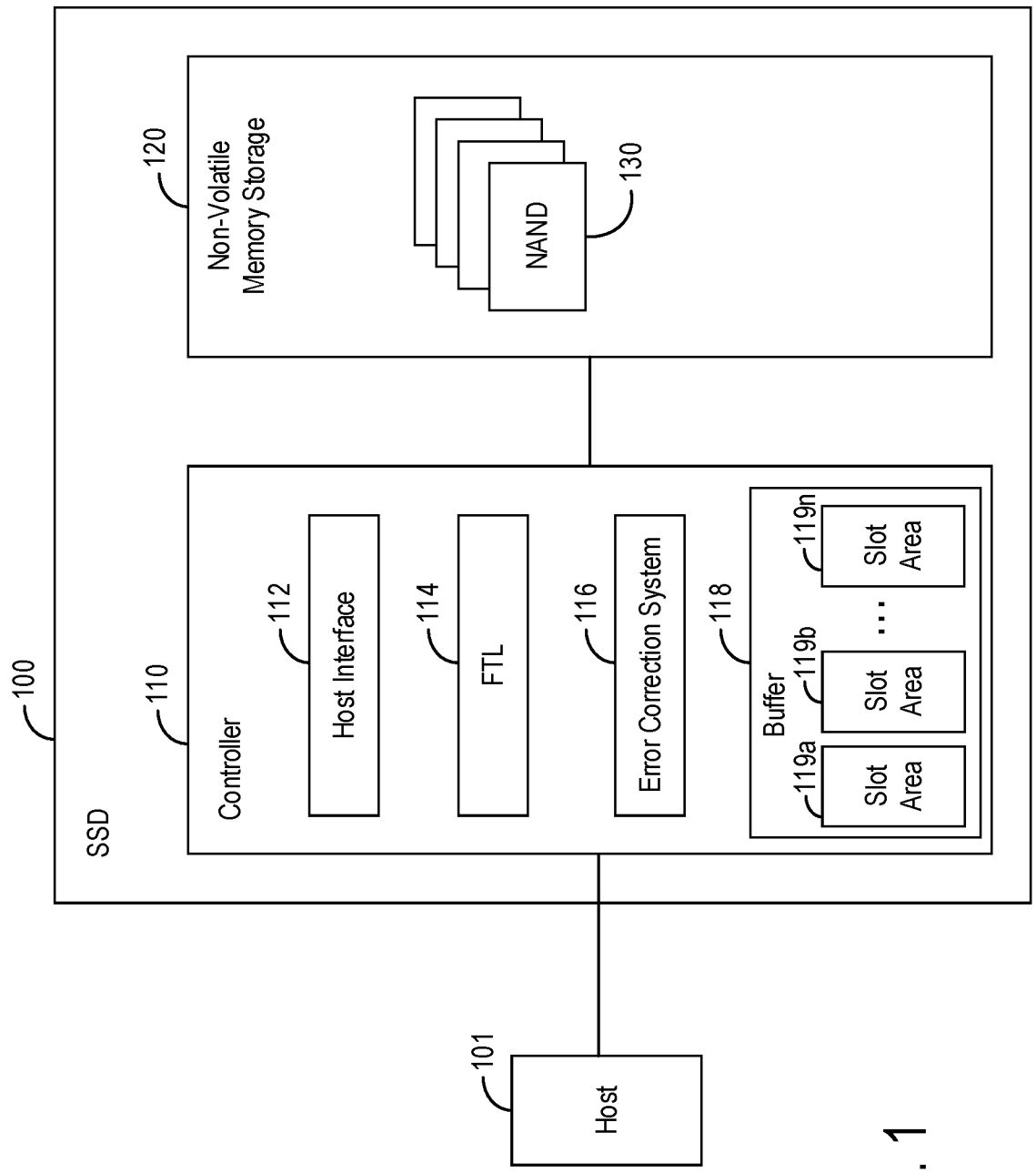
FIG. 1 shows a block diagram of examples of an SSD, according to some implementations.

To assist in illustrating the present implementations, FIG. 1 shows a block diagram of an SSD 100 according to some implementations. The SSD 100 is a non-volatile memory storage device that includes at least a controller 110 and a non-volatile memory storage 120. Other components of the SSD 100 are not shown for brevity. The non-volatile memory storage 120 is a memory array that includes NAND flash memory devices 130. Each of the NAND flash memory devices 130 includes one or more individual NAND flash dies, which are non-volatile memory capable of retaining data without power. Each die has one or more planes. Each plane has multiple blocks, and each block has multiple pages. While the NAND flash memory devices 130 are shown to be examples of the non-volatile memory storage 120, other examples of non-volatile memory technologies for implementing the non-volatile memory storage 120 include but are not limited to, Magnetic Random Access Memory (MRAM), Phase Change Memory (PCM), Ferro-Electric RAM (FeRAM), or the like.

The controller 110 can combine raw data storage in the NAND flash memory devices 130 such that those NAND flash memory devices 130 function as a single storage. The controller 110 can include a host interface 112, an FTL 114, an error correction system 116, a buffer 118, among other features of the controller 110. Some or all of host interface 112, FTL 114 and error correction system 116 can be implemented in hardware such as processors (e.g., CPUs or microcontrollers) or other types of dedicated hardware modules. In some arrangements, the software/firmware of one or more processors implementing host interface 112, FTL 114 and/or error correction system 116 can be stored in non-volatile memory of the controller 110 (not shown) or in any other suitable computer-readable storage medium (i.e. SSD firmware, as referred to herein).

The controller 110 includes suitable processing and memory capabilities for executing functions described herein, among other functions. The controller 110 manages various features for the NAND flash memory devices 130 including, but not limited to, I/O handling, reading, writing/programming, erasing, monitoring, logging, error handling, garbage collection, wear leveling, logical-to-physical address mapping, data protection (encryption/decryption), and the like. Thus, the controller 110 provides visibility to the NAND flash memory devices 130.

The host 101 (e.g., a host device such as a personal computer) connects to the SSD 100 via the host interface 112, which conforms to a storage interface standard. The SSD 100 functions as an external storage device of the host 101. Examples of the communication interface standard implemented for the host interface 112 include standards such as but not limited to, Serial Advanced Technology Attachment (SATA), Serial Attached SCSI (SAS), Peripheral Components Interconnect Express (PCIe), and so on. In some examples, the user of the host 101 is an SSD firmware developer who is interested in receiving and analyzing the statistics of the SSD 100 as described herein.

The FTL 114 (e.g., a FTL interface module, a FTL processor, and soon) can process an address mapping table (e.g., a L2P mapping table). The address mapping table is a mapping table that keeps records of the correspondence between LBAs and physical addresses. For example, the address mapping table can translate read and write commands (received from the host 101) in connection with LBAs into low-level commands that reference physical blocks using physical addresses. In some examples, a read or write command received from the host 101 includes at least a logical block address (LBA). The LBA is a logical address that identifies a logical block, which may be a region in a sector. In some examples, the write command can also include a number of regions/sectors to which the data is to be written. The address mapping table stores mapping between each logical address and one or more physical addresses (e.g., pages of a memory die) where data of the logical address is stored.

The FTL 114 can perform L2P operations based on the address mapping table. For example, the FTL 114 can translate a LBA into a physical address, thus resolving the physical address corresponding to the LBA. Responsive to receiving a write or read command (containing a LBA therein) from the host 101, the FTL 114 can look up the physical address corresponding to the LBA by using the address mapping table in order to write to or read from the physical address. The address mapping table can be stored in one or more of the non-volatile memory storage 120, a volatile memory (e.g., the buffer 118), or another suitable memory of the controller 110.

The error correction system 116 of the controller 110 can include or otherwise implement one or more Error Correction Code (ECC) encoders and one or more ECC decoders. The ECC encoders are configured to encode data (e.g., input payload) to be programmed to the non-volatile memory storage 120 (e.g., to the NAND flash memory devices 130) using suitable ECC. The ECC decoders are configured to decode the encoded data to correct programming errors, errors caused by reading with non-optimal thresholds, errors caused by retention/read-disturb stresses, and so on.

The buffer 118 is a memory device (e.g., a local memory) of the controller 110. In some examples, the buffer 118 is a volatile storage or a non-volatile storage. Examples of the buffer 118 include but are not limited to, Random Access Memory (RAM), Dynamic Random Access Memory (DRAM), Static Random Access Memory (SRAM), a Phase Change Memory (PCM), a Magnetic Random Access Memory (MRAM), and a Resistive Random Access memory (ReRAM). The buffer 118 can implement data caching. For example, in response to receiving write commands and associated data from the host 101 (via the host interface 112), the controller 110 acknowledges the write commands to the host 101 responsive to writing the data to the buffer 118. The controller 110 can write the data stored in the buffer 118 to the non-volatile memory storage 120. Once writing the data to physical addresses of the non-volatile memory storage 120 is complete, the FTL 114 updates mapping between LBAs associated with the data and the physical addresses identifying the physical locations, for example, in the L2P mapping table.

In some examples, the buffer 118 can store collected statistics data corresponding to one or more slots in one or more slot areas (e.g., slot areas 119a-119n). Each of the slot areas 119a-119n is a dedicated area, file, range, sector, or the like used to store statistics data for a given slot. A slot area may be formed from any suitable unit of storage such as physical units (e.g., flash memory cells, flash memory pages, and flash memory blocks), logical units (e.g., logical blocks or sectors), data structures (e.g., files or objects), and so on. For example, a slot area can include one or more physical units, one or more logical units, one or more data structures, and so on. While the slot areas 119a-119n are shown, statistics data for a given number slots can be stored in a same number of slot areas in the buffer 118 at any given time. Each of the slot areas 119a-119n can be created (e.g., allocated, assigned, or otherwise identify) dynamically, responsive to a corresponding start command in the manner described. In some examples, the controller 110 can collect the statistics data from various modules (e.g., the host interface 112, the FTL 114, the error correction system 116, the non-volatile memory storage 120, and so on) and submodules thereof, and store the statistics data in the buffer 118. Statistics data of the same slot, including statistics snapshot(s) collected at one or more time points within the slot, is stored in a same slot area in the buffer 118. Statistics data corresponding to different slots are stored in different slot areas in the buffer 118. In some examples, the buffer storing the statistics data for the slot areas 119a-119n can be different from the buffer performing data caching for write commands.

According to some arrangements, an SSD firmware developer operating the host 101 can issue commands to the SSD 100 (e.g., to the controller 110) to obtain statistics data specific to a start and an end of a test. A storage protocol such as, but not limited to, Non Volatile Memory Express (NVMe), NVMe over Fabric (NVMeoF), Serial ATA (SATA), Small Computer System Interface (SCSI), iSCSI (internet SCSI), Fiber Channel (FC) may be used to transport commands to the SSD. Since storage protocols may not have commands dedicated to controlling the collection of data statistics, a vendor unique command of the storage protocol may be used. The command can be a Get_Statistics Vendor Unique Command (VUC). In some implementations, the host 101 can issue a start command (e.g., a start Get_Statistics VUC) by setting a Statistics Slot Start flag as an input parameter. The start Get_Statistics VUC defines the start time of the test also as an input parameter. The start command can request the SSD firmware to create an area (e.g., the slot area 119a) in a storage device (e.g., the buffer 118) for storing one or more snapshots of statistics data of the SSD 100. In some implementations, the SSD firmware can determine the current statistics data in response to receiving the start Get_Statistics VUC, return the current statistics data to the host 101, and internally store the current statistics data as a start statistics snapshot in the slot area.

In some implementations, in response to determining that the test is complete, the host 101 can issue a stop command (e.g., a stop Get_Statistics VUC) by setting a Statistics Slot Stop flag as an input parameter. The stop Get_Statistics VUC defines the end time of the test. In response to receiving the stop Get_Statistics VUC, the SSD firmware sends two sets of statistics data back to the host 101. A first set of statistics data includes data stored in the slot area (e.g., the slot area 119a) corresponding to the slot, including the start statistics snapshot determined in response to the start Get_Statistics VUC. A second set of statistics data includes current statistics (a stop statistics snapshot) determined by the controller 110 in response to receiving the stop Get_Statistics VUC. In response to sending the two sets of statistics data back to the host 101, the SSD firmware clears (e.g., erased or deletes) any statistics data stored in the slot area. By sending the two sets of statistics data back to the host 101, the host 101 can determine the changes in the statistics data between the start statistics snapshot and the stop statistics snapshot.

In some implementations, the host 101 can issue any number of intermediate commands (e.g., intermediate Get- _Statistics VUCs) between the start command and the stop command. In some implementations, the SSD firmware can determine the current statistics data in response to receiving an intermediate Get_Statistics VUC, return the current statistics data to the host 101, and internally store the current statistics data as an intermediate statistics snapshot in the slot area.

An example Get_Statistics VUC (1) is shown below:

$$\text{Get\_Statistics(SlotStartFlag}=X,\text{SlotStopFlag}=Y) \quad (1).$$

As shown, the Get_Statistics VUC (1) includes two flags that can be set by the host 101, including the Statistics Slot Start flag ("SlotStartFlag") and the Statistics Slot Stop flag ("SlotStopFlag"). The host 101 can configure the Get_Statistics VUC (1) to be a start Get_Statistics VUC, a stop Get_Statistics VUC, or an intermediate Get_Statistics VUC by setting the flags to given values.

An example start Get_Statistics VUC (2) is shown below:

$$\text{Get\_Statistics(SlotStartFlag}=1,\text{SlotStopFlag}=0) \quad (2).$$

As shown, the host 101 can configure the Get_Statistics VUC (1) to be the start Get_Statistics VUC (2) by setting the Statistics Slot Start flag X to 1 and the Statistics Slot Stop flag Y to 0. The host 101 can send the start Get_Statistics VUC (2) to the SSD 100 at time A.

An example intermediate Get_Statistics VUC (3) is shown below:

$$\text{Get\_Statistics(SlotStartFlag}=0,\text{SlotStopFlag}=0) \quad (3).$$

As shown, the host 101 can configure the Get_Statistics VUC (1) to be the intermediate Get_Statistics VUC (3) by setting the Statistics Slot Start flag X to 0 and the Statistics Slot Stop flag Y to 0. The host 101 can send the intermediate Get_Statistics VUC (3) to the SSD 100 at time A+B.

An example stop Get_Statistics VUC (4) is shown below:

$$\text{Get\_Statistics(SlotStartFlag}=0,\text{SlotStopFlag}=1) \quad (4).$$

As shown, the host 101 can configure the Get_Statistics VUC (1) to be the stop Get_Statistics VUC (4) by setting the Statistics Slot Start flag X to 0 and the Statistics Slot Stop flag Y to 1. The host 101 can send the stop Get_Statistics VUC (4) to the SSD 100 at time A+C. Time A+C is after time A+B, e.g., A+C=A+B+D.

In some examples, one or more of the start command, the intermediate command, or the stop command further include a slot identifier (e.g., a parameter such as a number) that identifies a corresponding slot (e.g., one of Slot 1-Slot n). Accordingly, the controller 110 can identify a slot corresponding to a command using the slot identifier. In some examples, the one or more of the start command, intermediate command, or the stop command further include data type identifiers (e.g., parameters such as numbers), each of which identifies a type of statistics data or a group of statistics data requested by the host 101. Accordingly, the controller 110 can identify types of statistics data requested by the host 101 using the data type identifiers and collect those types of statistics data accordingly.

Figure 2:
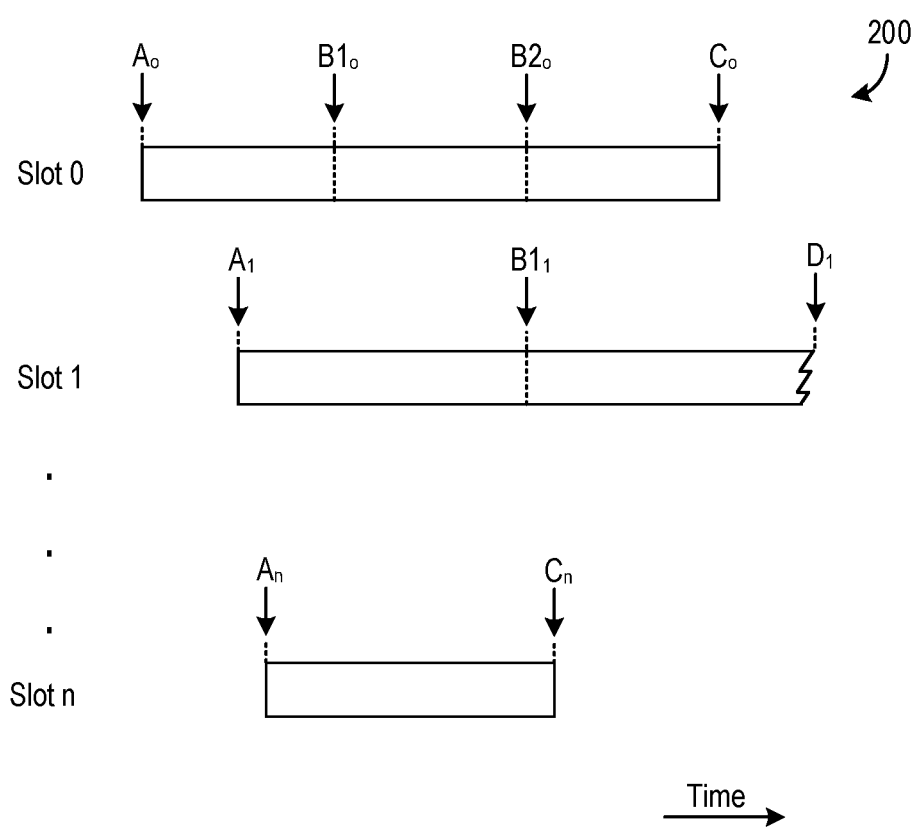
FIG. 2 is a diagram illustrating slot-based collection of SSD statistics, according to various implementations.

FIG. 2 is a diagram illustrating slot-based collection of SSD statistics, according to various implementations. Referring to FIGS. 1-2, each of Slot 0, Slot 1, . . . , Slot n represents a time interval within which statistics data can be collected from the various modules 112-120 of the SSD 100. In some examples, each of Slot 0, Slot 1, . . . , Slot n corresponds to a different test run by the host 101. In other examples, two or more of Slot 0, Slot 1, . . . , Slot n correspond to a same test run by the host 101, where the two or more of Slot 0, Slot 1, . . . , Slot n have different start time and/or stop time. Each of Slot 0, Slot 1, . . . , Slot n is initiated responsive to a start Get_Statistics VUC and ends with a stop Get_Statistics VUC or an SSD failure.

For example, in response to receiving a start Get_Statistics VUC from the host 101 at time $A_0$, the controller 110 creates the slot area 119a for storing statistics data corresponding to Slot 0, determines the current statistics data of the SSD 100 at time $A_0$, and stores the current statistics data as a start statistics snapshot in the slot area 119a. In response to receiving an intermediate Get_Statistics VUC from the host 101 at time $B1_0$, the controller 110 determines the current statistics data of the SSD 100 at time $B1_0$ and stores the current statistics data as an intermediate statistics snapshot in the slot area 119a. In response to receiving another intermediate Get_Statistics VUC from the host 101 at time $B2_0$, the controller 110 determines the current statistics data of the SSD 100 at time $B2_0$ and stores the current statistics data as another intermediate statistics snapshot in the slot area 119a.

In response to receiving a stop Get_Statistics VUC from the host 101 at time Co, the controller 110 determines the current statistics data of the SSD 100 at time Co and sends, to the host 101, the statistics data determined at time Co (as a stop statistics snapshot) and all statistics data (including the start statistics snapshot determined at time $A_0$ and the two intermediate statistics snapshots determined at time $B1_0$ and $B2_0$) stored in the slot area 119a. In response to sending the statistics data to the host 101, the controller 110 clears any statistics data stored in the slot area 119a.

In some implementations, the controller 110 can collect the statistics data for multiple slots at the same time. For example, after time $A_0$ and before time $B1_0$, the controller 110 receives another start Get_Statistics VUC from the host 101 at time $A_1$. In response to receiving the start Get_Statistics VUC from the host 101 at time $A_1$, the controller 110 creates the slot area 119b for storing statistics data corresponding to Slot 1, determines the current statistics data of the SSD 100 at time $A_1$, and stores the current statistics data as a start statistics snapshot in the slot area 119b. In response to receiving an intermediate Get_Statistics VUC from the host 101 at time $B1_1$, the controller 110 determines the current statistics data of the SSD 100 at time $B1_1$ and stores the current statistics data as an intermediate statistics snapshot in the slot area 119b.

Before the controller 110 receives a stop start Get_Statistics VUC from the host 101, the SSD 100 fails (e.g., the test performed by the host 101 fails) at time Di. In response to the failure, the controller 110 determines the current statistics data of the SSD 100 at time Di. The controller 110 stores, to another storage device other than the buffer 118, the statistics data determined at time Di (as a failure statistics snapshot) and all statistics data (including the start statistics snapshot determined at time $A_1$ and the intermediate statistics snapshot determined at time $B1_1$) stored in the slot area 119b. The another storage device can be the non-volatile memory storage 120 (e.g., the NAND flash memory devices 130), in some examples. In other examples, the another storage device can be a storage device external to the SSD 100, such that the SSD 100 is communicably coupled to the external storage device via an intra-platform communication mechanism (e.g., a Top of Rack (TOR) switch), an inter-platform communication mechanism (e.g., a router), or another suitable wired or wireless network.

After time $A_0$ and time $A_1$, the controller 110 receives another start Get_Statistics VUC from the host 101 at time $A_n$. In response to receiving the start Get_Statistics VUC from the host 101 at time $A_n$, the controller 110 creates the slot area 119n for storing statistics data corresponding to Slot n, determines the current statistics data of the SSD 100 at time $A_n$, and stores the current statistics data as a start statistics snapshot in the slot area 119n.

In response to receiving a stop Get_Statistics VUC from the host 101 at time Cn, the controller 110 determines the current statistics data of the SSD 100 at time Cn and sends, to the host 101, the statistics data determined at time Cn (as a stop statistics snapshot) and the start statistics snapshot determined at time $A_n$ (stored in the slot area 119n). In response to sending the statistics data back to the host 101, the controller 110 clears any statistics data stored in the slot area 119n.

The controller 110 can receive additional start Get_Statistics VUCs from the host 101. In response to receiving each of the additional start Get_Statistics VUCs, the controller 110 can create an additional area (e.g., one of slot areas 119c-119n-1) corresponding to one of Slot 2-Slot n-1 for storing statistics data in the manner described.

In some arrangements, the statistics data that can be requested by the Get_Statistics VUC include statistics, parameters, values, and data regarding drive information of the SSD 100. In some examples, the drive information includes lifecycles (wear-out state) of NAND blocks of the SSD. Each NAND block has a limited lifecycle in terms of write and erases, due to wear. The SSD firmware is preferred to write data to the blocks uniformly (e.g., wear-leveling) such that a pool of blocks is used uniformly. In some examples, the drive information includes data utilization information, ECC state, endurance information, and so on. The drive information can be received from the FTL 114 (e.g., an FTL counter thereof) and the error correction system 116. The controller 110 can send a request to the FTL 114 and the error correction system 116 for the drive information and receive the drive information from the FTL 114 and the error correction system 116.

In that regard, some examples of the types of drive information include, but are not limited to, erase count, drive write, media write, utilization, bad block count, Bit Error Rate (BER) histogram, ECC state histogram, and so on. Erase count refers to an average erase count, taking into account all blocks in the NAND flash memory devices 130. Drive write refers to an amount of data written to the NAND flash memory devices 130. Media write refers to an amount of data written to a particular one of the NAND flash memory devices 130. Utilization refers to an amount of data storage capabilities of the NAND flash memory devices 130 that is currently being utilized. Bad block count refers to a number of bad blocks in the NAND flash memory devices 130. BER histogram refers to an error rate per block. ECC state histogram refers to a number of blocks in each ECC state or algorithm.

In some examples, the drive information includes a number of errors per page or per block encountered by the error correction system 116 (when reading data from the page or block), a number of errors corrected by the error correction system 116 (when reading data from the page or block), a number of errors unable to be corrected by the error correction system 116 (when reading data from the page or block), and so on. Such information can be received from the error correction system 116.

In some arrangements, the statistics data that can be requested by the Get_Statistics VUC include statistics, parameters, values, and data regarding workload information/profile of the SSD 100. The workload information can be gathered from a data-path module of the SSD device 100. The controller 110 can send a request to the data-path module for the workload information and receive the workload information from the data-path module.

In that regard, some examples of the types of the workload information include, but are not limited to, read I/O count, write I/O count, total write, total read, and write entropy. The read I/O count refers to a number of read commands executed by the SSD 110. The write I/O count refers to a number of write commands executed by the SSD 110. The total write parameter refers to a total amount of data written to the SSD 110. The total read parameter refers to a total amount of data stored by the SSD 110 that had been read. Write entropy (H) refers to a degree of randomness in data stored by the SSD 110.

In some examples, the host 101 requests different types of statistics data for each of Slot 0, Slot 1, . . . , Slot n. In other examples, the host 101 requests the same types of statistics data for two or more of Slot 0, Slot 1, . . . , Slot n.

Figure 3:
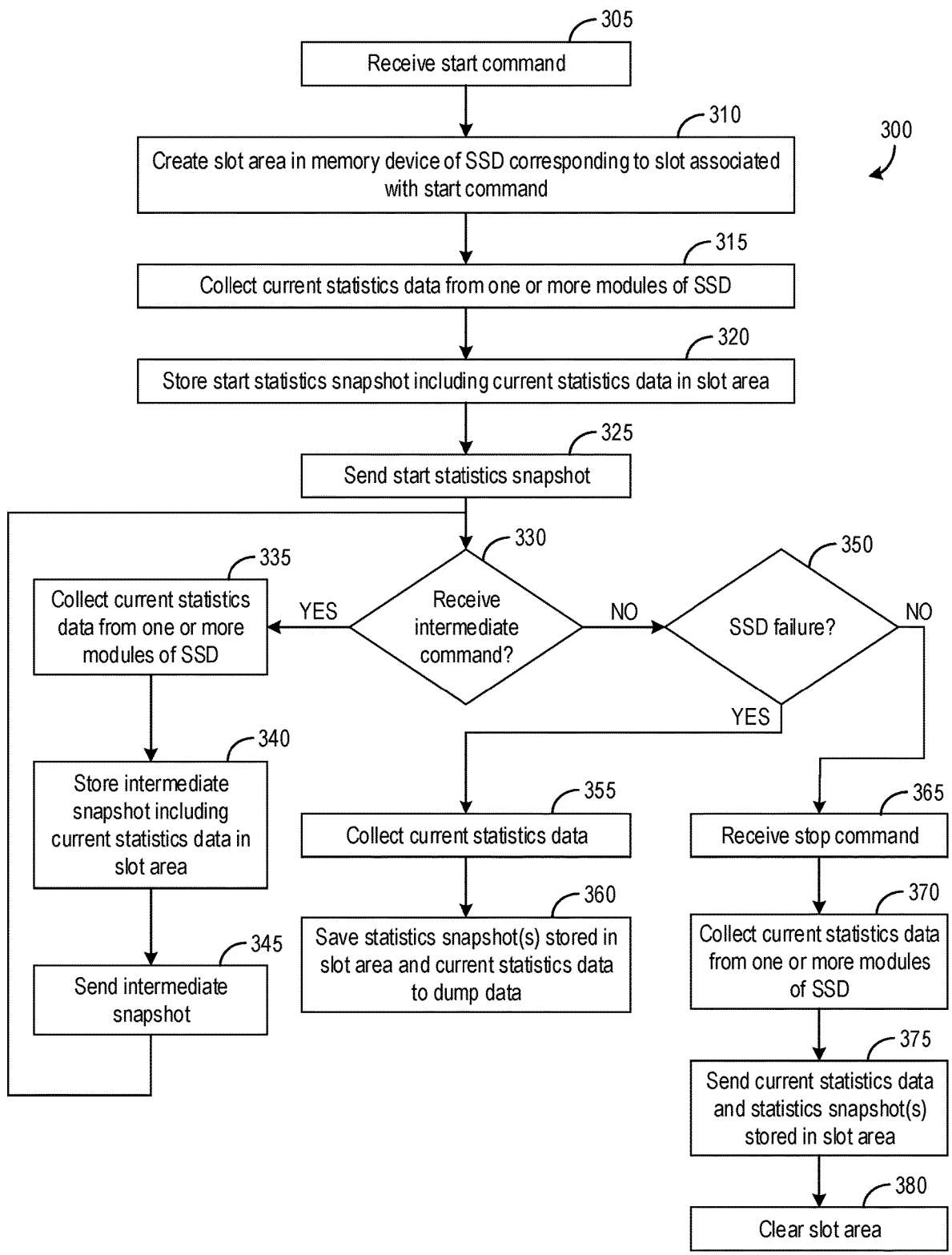
FIG. 3 is a process flow diagram illustrating an example method for collecting SSD statistics, according to various implementations.

FIG. 3 is a process flow diagram illustrating an example method 300 for collecting SSD statistics, according to various implementations. Referring to FIGS. 1-3, the method 300 is performed by the controller 110. The method 300 relates to collecting statistics data for a slot. That is, the start command, the intermediate command, and the stop command described with reference to the method 300 are associated with a same slot and may include a same slot identifier. The method 300 can be performed for each of the Slot 0-Slot n shown in FIG. 2.

At 305, the controller 110 receives a start command from the host 101. The start command can be a start Get_Statistics VUC. The start command corresponds to a slot (e.g., one of Slot 1-Slot n). At 310, the controller 110 creates a slot area in a memory device corresponding to a slot associated with the start command. The slot area can be one of the slot areas 119a-119n in some examples. The memory device can be the buffer 118 in some examples. In other words, the controller 110 can allocate, assign, or otherwise identify a slot area for storing statistics data corresponding to a given slot.

At 315, the controller 110 collects current statistics data from one or more of the modules 112-120 of the SSD 100, responsive to the start command. In other words, the controller 110 requests the modules 112-120 for the statistics data (e.g., at times $A_0$, $A_1$, or $A_n$), responsive to the start command.

At 320, the controller 110 stores start statistics snapshot including the current statistics data (determined responsive to the start command received at 305) in the slot area. The controller 110 can receive the current statistics data from the modules 112-120 and store the current statistics data as the start statistics snapshot in the slot area. At 325, the controller 110 sends the start statistics snapshot to the host 101.

At 330, the controller 110 may receive an intermediate command from the host 101. The intermediate command can bean intermediate Get_Statistics VUC. In response to receiving the intermediate command (330:YES), the controller 110 collects the current statistics data from one or more of the modules 112-120 of the SSD 100, at 335. In other words, the controller 110 requests the modules 112-120 for the statistics data (e.g., at times $B1_0$, $B2_0$, or $B1_1$), responsive to the intermediate command.

At 340, the controller 110 stores an intermediate snapshot including the current statistics data (determined responsive to the intermediate command received at 330) in the slot area. The controller 110 can receive the current statistics data from the modules 112-120 and store the current statistics data as the intermediate statistics snapshot in the slot area. At 345, the controller 110 sends the intermediate snapshot to the host 101. After block 345, the method 300 returns to block 330.

The controller 110 may not receive any intermediate commands (330:NO). In some examples, the SSD 100 may encounter an SSD failure at 350. The SSD failure may occur before or after any intermediate command is sent by the host 101. In response to detecting the SSD failure (350:YES), the controller 110 collects the current statistics data from one or more of the modules 112-120 of the SSD 100, at 355. In other words, the controller 110 requests the modules 112-120 for the statistics data (e.g., at time Di), responsive to detecting the failure. The statistics data determined responsive to the failure is a failure statistics snapshot.

At 360, the controller 110 saves the statistics snapshot(s) stored in the slot area and the current statistics data to dump data. In other words, the controller 110 stores, to another storage device other than the buffer 118, the failure statistics snapshot and all snapshots (including the start statistics snapshot and intermediate statistics snapshot(s), if any) stored in the slot area.

In the case that no SSD failure occurs (350:NO), the controller 110 receives the stop command, at 365. That is, if the SSD 100 does not fail before receiving the stop command, the controller 110 receives the stop command. The stop command can be a stop Get_Statistics VUC. In response to receiving the stop command, the controller 110 collects the current statistics data from one or more of the modules 112-120 of the SSD 100, at 370. In other words, the controller 110 requests the modules 112-120 for the statistics data (e.g., at times Co or Cn), responsive to the stop command.

At 375, the controller 110 sends the current statistics data (collected responsive to the stop command) and all statistics snapshot(s) stored in the slot area to the host 101. The statistics snapshots stored in the slot area include the start statistics snapshot and intermediate statistics snapshot(s), if any.

At 380, the controller 110 clears the slot area. That is, the controller 110 erases any statistics snapshots stored in the slot area, so that the memory of the slot area can be re-used to store statistics snapshots for another slot.

Figure 4:
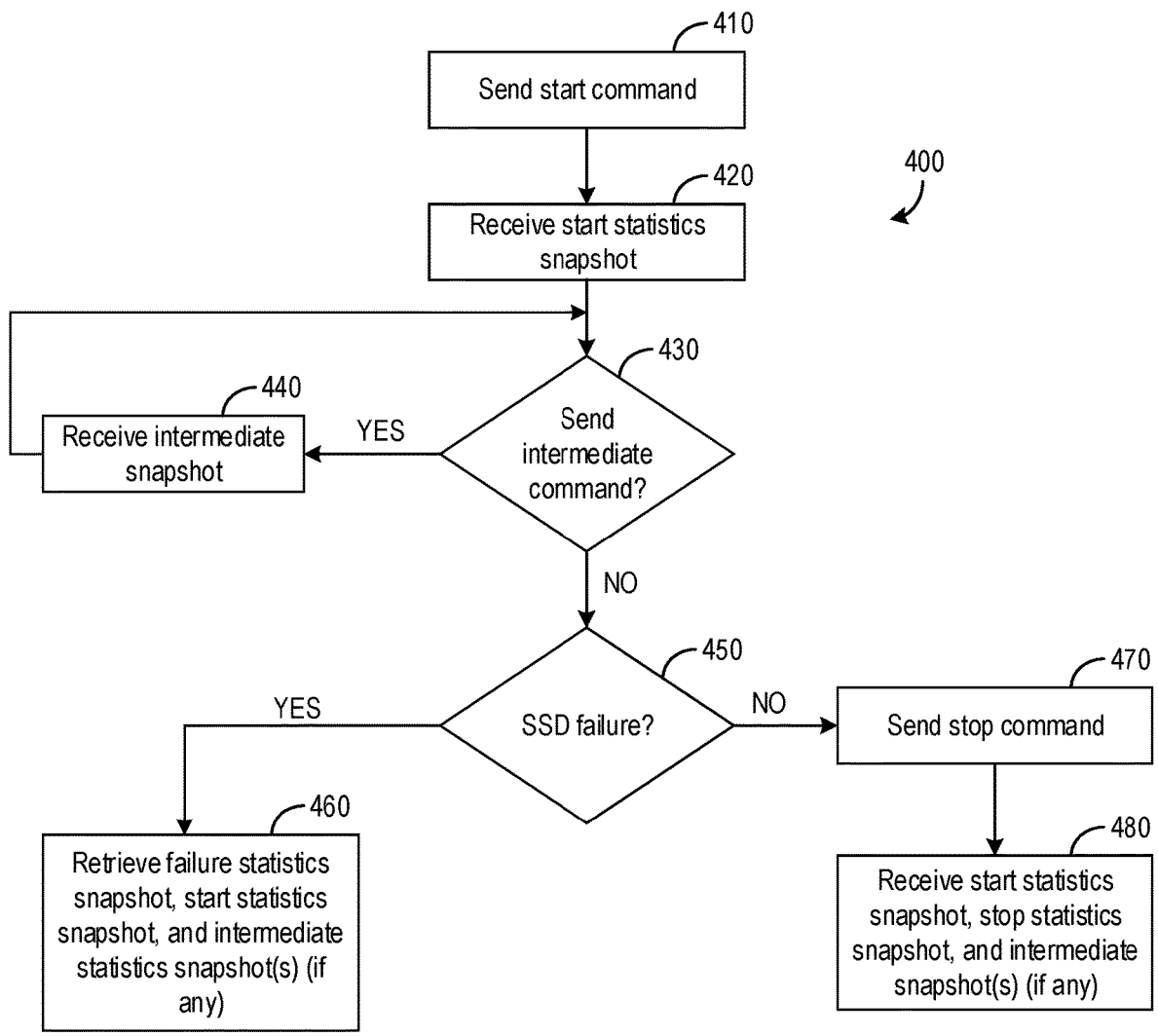
FIG. 4 is a process flow diagram illustrating an example method for collecting SSD statistics, according to various implementations.

FIG. 4 is a process flow diagram illustrating an example method 400 for collecting SSD statistics, according to various implementations. Referring to FIGS. 1-3, the method 300 is performed by the host 101. The method 400 relates to collecting statistics data for a slot. That is, the start command, the intermediate command, and the stop command described with reference to the method 400 are associated with a same slot and may include a same slot identifier. The method 400 can be performed for each of the Slot 0-Slot n shown in FIG. 2.

At 410, the host 101 sends a start command (e.g., at times $A_0$, $A_1$, or $A_n$) to the controller 110. At 420, the host 101 receives the start statistics snapshot from the controller 110. At 430, the host 101 may send one or more intermediate commands. In the case that the host 101 sends an intermediate command (430:YES), e.g., at times $B1_0$, $B2_0$, or $B1_1$, the host 101 receives the intermediate snapshot, at 440. After block 440, the method 400 returns to block 430.

The host 101 may not send an intermediate command (430:NO). In some examples, the SSD 100 may encounter the SSD failure at 450. If the SSD failure occurs (450:YES), the host 101 can retrieve the failure statistics snapshot and all snapshots (including the start statistics snapshot and intermediate statistics snapshot(s), if any) from another storage device, at 460.

On the other hand, if the SSD failure does not occur (450:NO), the host 101 sends a stop command, at 470. At 480, the host 101 receives, from the controller 110, the start statistics snapshot, the stop statistics snapshot, and intermediate statistics snapshot(s), if any.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storages, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method for collecting statistics data of a storage device, comprising:
   receiving a start command from a host at a first time, wherein the start command includes a slot identifier;
   in response to receiving the start command:
      allocating a slot area of a memory device of the storage device associated with the slot identifier;
      collecting first statistics data from one or more modules of the storage device; and
      storing the first statistics data in the allocated slot area of the memory device of the storage device associated with the slot identifier;
   in response to receiving a stop command at a second time after the first time, wherein the stop command includes the slot identifier:
      collecting second statistics data from the one or more modules; and
      storing the second statistics data in the slot area of the memory device of the storage device such that the slot area associated with the slot identifier included in both the start command and the stop command contains collected statistics data for the time interval from the first time to the second time,
   wherein the slot identifier in the start command and the stop command is associated with a test of the storage device performed by the host, wherein storing the first statistics data in the slot area is performed further in response to the slot identifier in the start command, and wherein storing the second statistics data in the slot area is performed further in response to the slot identifier in the stop command.

2. The method of claim 1, wherein each of the start command and the stop command is a storage protocol Vendor Unique Command (VUC).

3. The method of claim 1, wherein the storage device is a Solid State Drive (SSD).

4. The method of claim 3, wherein the memory device is one of a Random Access Memory (RAM), a Dynamic Random Access Memory (DRAM), a Static Random Access Memory (SRAM), a Phase Change Memory (PCM), a Magnetic Random Access Memory (MRAM), or a Resistive Random Access memory (ReRAM).

5. The method of claim 1, further comprising
   receiving an intermediate command after receiving the start command; and
   in response to receiving the intermediate command:
      collecting third statistics data from the one or more modules; and
      storing the third statistics data in the slot area.

6. The method of claim 5, wherein the third statistics data is sent with the first statistics data and the second statistics data in response to receiving the stop command.

7. The method of claim 6, further comprising clearing the slot area of the first statistics data.

8. The method of claim 1, further comprising in response to a test failure:
   collecting failure statistics data from the one or more modules; and saving the first statistics data and the failure statistics data to dump data.

9. A storage device, comprising:
a memory device;
one or more modules; and
a controller that is configured to:
  receive a start command from a host at a first time, wherein the start command includes a slot identifier;
  in response to receiving the start command:
    allocate a slot area of the memory device of the storage device associated with the slot identifier;
    collect first statistics data from the one or more modules; and
    store the first statistics data in the allocated slot area of the memory device of the storage device associated with the slot identifier;
  in response to receiving a stop command at a second time after the first time, wherein the stop command includes the slot identifier:
    collect second statistics data from the one or more modules; and
    store the second statistics data in the slot area of the memory device of the storage device such that the slot area associated with the slot identifier included in both the start command and the stop command contains collected statistics data for the time interval from the first time to the second time,
  wherein the slot identifier in the start command and the stop command is associated with a test of the storage device performed by the host, wherein storing the first statistics data in the slot area is performed further in response to the slot identifier in the start command, and wherein storing the second statistics data in the slot area is performed further in response to the slot identifier in the stop command.

10. The storage device of claim 9, wherein each of the start command and the stop command is a storage protocol Vendor Unique Command (VUC).

11. The storage device of claim 9, wherein the storage device is a Solid State Drive (SSD).

12. The SSD device of claim 11, wherein the memory device is one of a Random Access Memory (RAM), a Dynamic Random Access Memory (DRAM), a Static Random Access Memory (SRAM)), a Phase Change Memory (PCM), a Magnetic Random Access Memory (MRAM), or a Resistive Random Access memory (ReRAM).

13. The storage device of claim 9, wherein the controller is further configured to:
  receive an intermediate command after receiving the start command; and
  in response to receiving the intermediate command:
    collect third statistics data from the one or more modules; and
    store the third statistics data in the slot area.

14. The storage device of claim 13, wherein the controller is configured to send the third statistics data with the first statistics data and the second statistics data in response to receiving the stop command.

15. The storage device of claim 14, wherein the controller is configured to erase the slot area of the first statistics data, the second statistics data and the third statistics data after sending the first statistics data, the second statistics data and the third statistics data.

16. The storage device of claim 9, wherein the controller is configured to, in response to a test failure:
  collect failure statistics data from the one or more modules; and
  save the first statistics data and the failure statistics data to dump data.

17. A non-transitory computer-readable medium storing computer-readable instructions, such that when executed, causes a controller of a Solid State Drive (SSD) device to:
  receive a start command from a host at a first time, wherein the start command includes a slot identifier;
  in response to receiving the start command:
    allocate a slot area of a memory device associated with the slot identifier;
    collect first statistics data from one or more modules of the SSD; and
    store the first statistics data in the allocated slot area associated with the slot identifier;
  in response to receiving a stop command at a second time after the first time, wherein the stop command includes the slot identifier:
    collect second statistics data from the one or more modules; and
    store the second statistics data in the slot area such that the slot area associated with the slot identifier included in both the start command and the stop command contains collected statistics data for the time interval from the first time to the second time,
  wherein the slot identifier in the start command and the stop command is associated with a test of the storage device performed by the host, wherein storing the first statistics data in the slot area is performed further in response to the slot identifier in the start command, and wherein storing the second statistics data in the slot area is performed further in response to the slot identifier in the stop command.

18. The non-transitory computer-readable medium of claim 17, wherein the controller is further caused to:
  receive an intermediate command after receiving the start command; and
  in response to receiving the intermediate command:
    collect third statistics data from the one or more modules; and
    store the third statistics data in the slot area,
  wherein the controller sends the third statistics data with the first statistics data and the second statistics data in response to receiving the stop command.

19. The non-transitory computer-readable medium of claim 17, wherein the controller is further caused to, in response to a test failure:
  collect failure statistics data from the one or more modules; and
  save the first statistics data and the failure statistics data to dump data.

* * * * *